US010375742B2

(12) United States Patent
Sasadai (10) Patent No.: US 10,375,742 B2
(45) Date of Patent: Aug. 6, 2019

(54) COMMUNICATION APPARATUS AND STORAGE MEDIUM SUITABLE FOR CONNECTING TO WIRELESS LAN (LOCAL AREA NETWORK)

(71) Applicant: KYOCERA Document Solutions Inc., Osaka (JP)

(72) Inventor: Koji Sasadai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/796,763

(22) Filed: Oct. 28, 2017

(65) Prior Publication Data

US 2018/0124841 A1   May 3, 2018

(30) Foreign Application Priority Data

Oct. 28, 2016  (JP) ................................ 2016-211874

(51) Int. Cl.
    | | |
    |---|---|
    | *G06F 3/12* | (2006.01) |
    | *H04W 76/10* | (2018.01) |
    | *H04W 88/02* | (2009.01) |
    | *H04W 84/12* | (2009.01) |

(52) U.S. Cl.
CPC .......... *H04W 76/10* (2018.02); *G06F 3/1204* (2013.01); *G06F 3/1236* (2013.01); *G06F 3/1285* (2013.01); *G06F 3/1292* (2013.01); *H04W 84/12* (2013.01); *H04W 88/02* (2013.01)

(58) Field of Classification Search
CPC ............................. H04W 76/02; H04W 84/12
See application file for complete search history.

(56) References Cited

U.S. PATENT DOCUMENTS

2006/0089987 A1*  4/2006  Igarashi  ............ H04L 29/12783
                                                                    709/225
2006/0128360 A1*  6/2006  Hibino  .................. H04L 63/104
                                                                    455/411
(Continued)

FOREIGN PATENT DOCUMENTS

JP           2014-216913 A      11/2014

*Primary Examiner* — Parth Patel
(74) *Attorney, Agent, or Firm* — Hawaii Patent Services; Nathaniel K. Fedde; Kenton N. Fedde (57) ABSTRACT

Provided is a communication apparatus for preventing a shortage of wireless LAN resources. A communication-control unit controls wireless communication via an access point and P2P type communication (P2P communication); a connection-information-managing unit manages connection information of the access point, and request-having information that indicates there is a connection request from a portable terminal using the wireless communication; and a system-control unit causes the connection-information-managing unit to change the connection information when the connection-information-managing unit is managing the request-having information. By changing the connection information of the access point when there is a connection request from a portable terminal using wireless communication, automatic connection that is executed after cutting communication is selected on the portable terminal side is disabled so that unintended connection requests are not received from the portable terminal side.

3 Claims, 7 Drawing Sheets

(56) References Cited

U.S. PATENT DOCUMENTS

| | | | |
|---|---|---|---|
| 2007/0053335 A1* | 3/2007 | Onyon | H04L 29/06027 370/338 |
| 2007/0153747 A1* | 7/2007 | Pan | H04W 36/14 370/338 |
| 2007/0161404 A1* | 7/2007 | Yasujima | H04W 88/06 455/557 |
| 2009/0232138 A1* | 9/2009 | Gobara | H04L 12/4633 370/392 |
| 2010/0246506 A1* | 9/2010 | Krishnaswamy | H04W 72/085 370/329 |
| 2012/0281686 A1* | 11/2012 | Pollari | G06Q 30/02 370/338 |
| 2013/0010334 A1* | 1/2013 | Akiba | G03G 15/5083 358/1.16 |
| 2013/0044739 A1* | 2/2013 | Huang | H04W 52/0216 370/338 |
| 2013/0057897 A1* | 3/2013 | Park | G06F 21/608 358/1.14 |
| 2013/0057912 A1* | 3/2013 | Park | H04L 63/102 358/1.15 |
| 2014/0112333 A1* | 4/2014 | Oberle | H04M 3/42374 370/352 |
| 2014/0185604 A1* | 7/2014 | Kil | H04W 48/20 370/338 |
| 2014/0219194 A1* | 8/2014 | Varoglu | H04W 36/14 370/329 |
| 2014/0320886 A1* | 10/2014 | Uchikawa | H04N 1/4433 358/1.14 |
| 2015/0207766 A1* | 7/2015 | Lindner | H04L 51/06 709/206 |
| 2015/0373036 A1* | 12/2015 | Patne | H04L 63/1416 726/23 |
| 2016/0011824 A1* | 1/2016 | Ishimura | G06F 3/1236 358/1.15 |
| 2016/0066275 A1* | 3/2016 | Tsuzuki | H04W 52/0235 370/311 |
| 2016/0135241 A1* | 5/2016 | Gujral | H04W 4/70 370/328 |
| 2016/0219329 A1* | 7/2016 | Jee | H04N 21/4367 |
| 2016/0234626 A1* | 8/2016 | Ray | H04L 67/104 |
| 2016/0300049 A1* | 10/2016 | Guedalia | G06F 21/316 |
| 2016/0316500 A1* | 10/2016 | Aliyar | H04W 76/14 |
| 2017/0150439 A1* | 5/2017 | Sasadai | H04L 67/1074 |
| 2017/0251061 A1* | 8/2017 | Sakabe | H04L 67/141 |
| 2018/0027599 A1* | 1/2018 | Sasadai | H04W 76/11 370/328 |

* cited by examiner

FIG.2

COMMUNICATION APPARATUS AND STORAGE MEDIUM SUITABLE FOR CONNECTING TO WIRELESS LAN (LOCAL AREA NETWORK)

INCORPORATION BY REFERENCE

This application is based on and claims the benefit of priority from Japanese Patent Application No. 2016-211874 filed on Oct. 28, 2016, the contents of which are hereby incorporated by reference.

BACKGROUND

The present disclosure relates to a communication apparatus and a storage medium that are suitable for connecting to a wireless LAN (Local Area Network).

Between typical apparatuses such as a portable terminal, image-processing apparatus and the like that are capable of P2P (Peer To Peer) communication and that include a communication (hereafter, referred to as P2P (Peer To Peer) communication) function based on the P2P (Peer To Peer) method (for example, Wi-Fi Direct (registered trademark) that is a wireless LAN), direct transmission or reception of data is possible (Ad-hoc mode) even when there is no access point (AP) in Wi-Fi (registered trademark) communication.

In typical technology that is related to this kind of P2P communication, there are communication devices that determine whether or not an external device of a specified communication party meets specified conditions, and when the device does not meet the specified conditions, determines whether or not to execute wireless communication based on a user instruction. Moreover, when it is determined that the device meets the specified conditions, the communication device sets whether to operate as an access point or to operate as a client.

SUMMARY

A communication apparatus according to the present disclosure includes a communication-control unit, a connection-information-managing unit and a system-control unit. The communication-control unit controls wireless communication via an access point and P2P type communication. The connection-information-managing unit manages connection information of the access point, and request-having information that indicates there is a connection request from a client using the wireless communication. The system-control unit causes the connection-information-managing unit to change the connecting information when the connection-information-managing unit is managing the request-having information.

A non-transitory computer-readable recording medium according to the present disclosure stores a communication program that can be executed by a computer of a communication apparatus; and the communication program causes the computer to operate as: a communication-control unit that controls wireless communication via an access point and P2P type communication; a connection-information-managing unit that manages connection information of the access point, and request-having information that indicates there is a connection request from a client using the wireless communication; and a system-control unit that causes the connection-information-managing unit to change the connecting information when the connection-information-managing unit is managing the request-having information.

DETAILED DESCRIPTION

Figure 1:
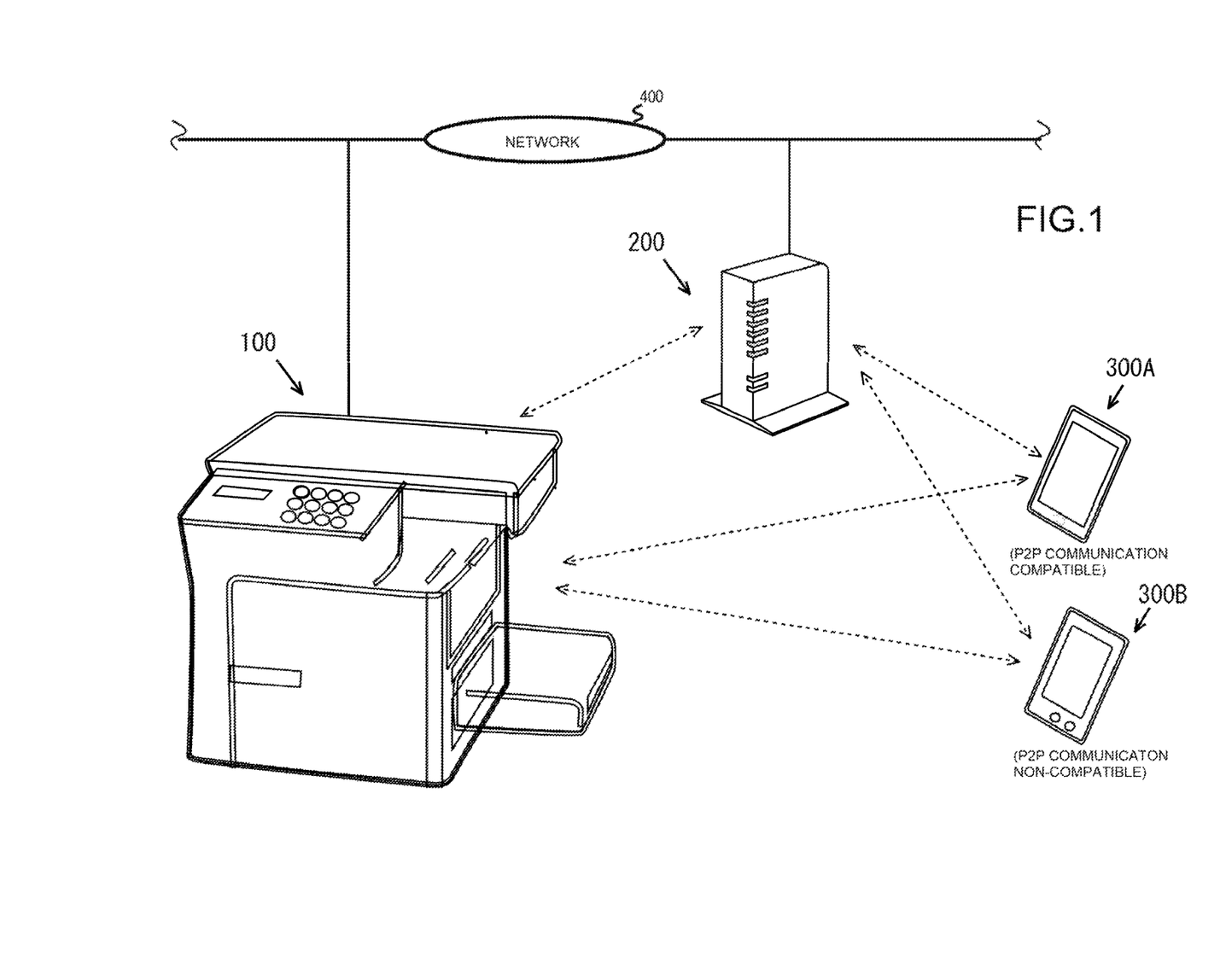
FIG. 1 illustrates an example of a communication system of an embodiment of a communication apparatus according to the present disclosure.

In the following, an embodiment of a communication apparatus according to the present disclosure will be explained with reference to FIG. 1 to FIG. 6. FIG. 1 illustrates an example of a communication system according to an embodiment of a communication apparatus according to the present disclosure. The communication apparatus illustrated in FIG. 1 is taken to be a MFP (Multifunction Peripheral) that is a combination-type image forming apparatus that is equipped, for example, with a printing function, a copying function, a FAX function, a data transmission/reception function via a network 400, and the like.

First, as illustrated in FIG. 1, a communication system includes a MFP 100, a relay apparatus 200, and portable terminals 300A, 300B. The MFP 100 has at least a wireless LAN communication function and the like based on at least the Wi-Fi (registered trademark) and Wi-Fi Direct (registered trademark) standards. In the following, communication via a Wi-Fi communication access point will be simply called wireless communication, and communication based on Wi-Fi Direct (registered trademark) will be called P2P (Peer To Peer) communication.

The relay apparatus 200 is a wireless LAN access point. The portable terminal 300A has at least wireless communication and P2P communication functions and the like. In other words, the wireless terminal 300A is compatible with P2P communication. On the other hand, the portable terminal 300B has at least a wireless communication function and the like, however, does not have a P2P communication function. In other words, the portable terminal 300B is not compatible with P2P communication. The portable terminals 300A, 300B can connect to the MFP 100 or to a network 400.

Figure 2:
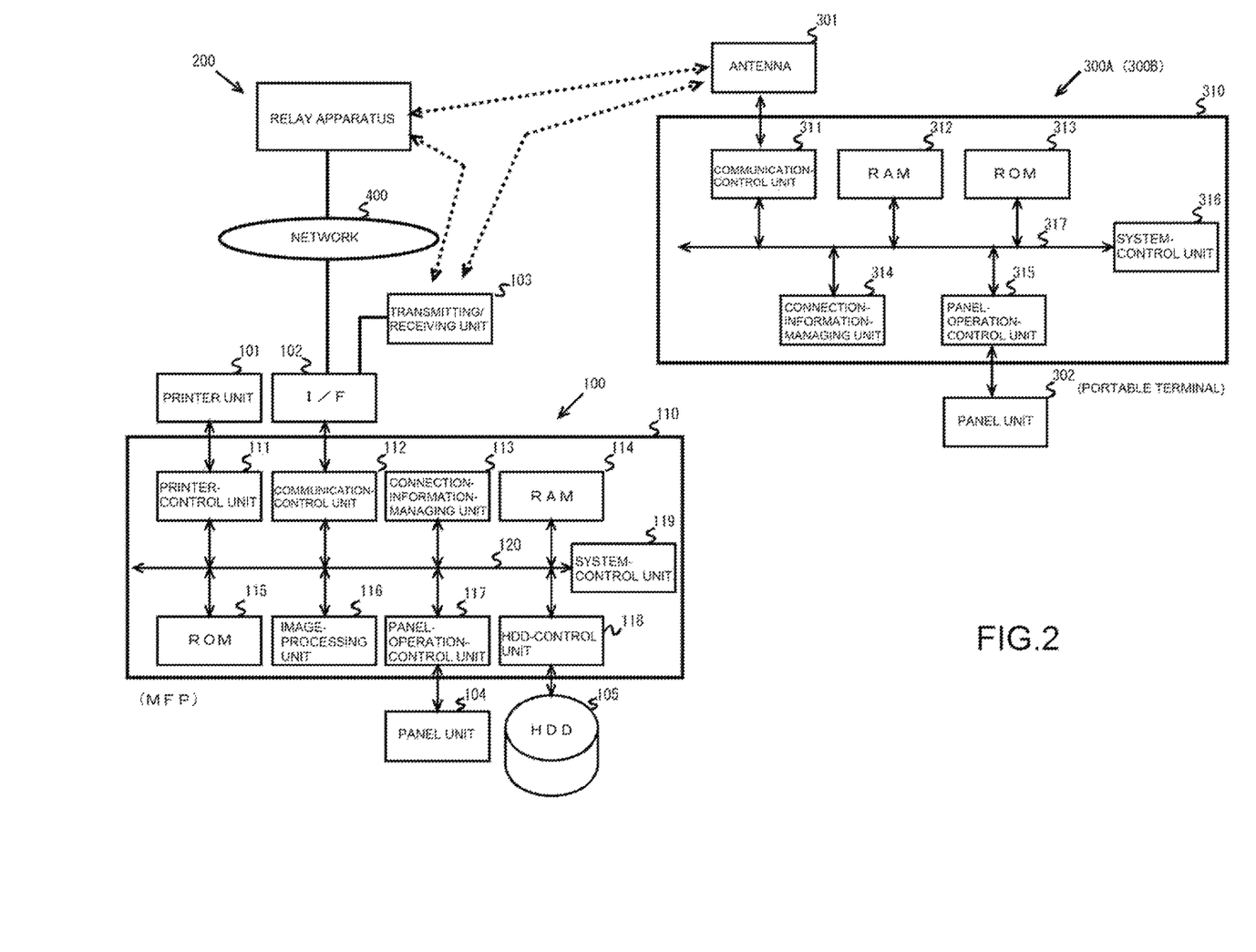
FIG. 2 illustrates an example of the configuration of the MFP and portable terminal illustrated in FIG. 1.

Next, an example of the configuration of the MFP 100 and portable terminals 300A, 300B will be explained with reference to FIG. 2. In the following, the configurations of the portable terminals 300A, 300B are nearly the same, so portable terminal 300A will be explained as a representative.

First, The MFP 100 includes a control unit 110 that controls a printer unit 101, an I/F 102, a transmitting/receiving unit 103, a panel unit 104, and a HDD (hard disk drive) 105. The MFP 100 may also include a scanner unit, a FAX unit and the like.

The printer unit 101 is a device that prints images on paper based on printing data that is outputted from the control unit 110. The I/F 102, takes charge of communication with the portable terminal 300A via the network 400. Moreover, the I/F 102 takes charge of communication with the portable terminal 300A via the transmitting/receiving unit 103. It is necessary to separately provide an I/F 102 for handling communication via the network 400 and for handling communication via the transmitting/receiving unit 103, however, for convenience of explanation, the I/F 102 is illustrated as being one. Moreover, the I/F 102 may also take charge of communication with a content server, web server and the like.

The transmitting/receiving unit 103 receives or transmits radio waves by wireless communication and P2P communication. The panel unit 104 is a device such as a touch panel that performs a display for the printing function, copying function, the FAX function, the data transmission/reception function via a network of the MFP 100, and or various settings. Moreover, the panel unit 104, as will be described in detail later, displays a confirmation screen 104A for prompting whether or not to activate the P2P communication function as a GO (Group Owner), and a confirmation screen 104B for wireless communication connection information.

The HDD 105 is a storage device that stores application programs for providing the various functions of the MFP 100. Moreover, the HDD 105 has user boxes for storing printing jobs that are registered from the portable terminals 300A, 300B, for example, or a user terminal.

The control unit 110 is a processor for controlling the overall operation of the MFP 100 by executing an image-forming program, a control program and the like. The control unit 110 includes a printer-control unit 111, a communication-control unit 112, a connection-information-managing unit 113, RAM 114, ROM 115, image-processing unit 116, panel-operation-control unit 117, HDD-control unit 118, and system-control unit 119. Moreover, these units are connected to a data bus 120. The printer-control unit 111 controls the printing operation by the printer unit 101. The communication-control unit 112, via the I/F 102, controls communication via the network 400 and communication via the transmitting/receiving unit 103. It is necessary to separately provide a communication-control unit 112 that handles communication via the network 400 and a communication-control unit 112 that handles communication via the transmitting/receiving unit 103, however, for convenience of explanation, the communication-control unit 112 is illustrated as being one.

The connection-information-managing unit 113 manages wireless communication dedicated software for executing wireless communication, P2P communication dedicated software for executing P2P communication, and connection information for access points in wireless communication. Moreover, the connection-information-managing unit 113, according to an instruction from the system-control unit 119, activates the wireless communication dedicated software and P2P communication dedicated software. Connection information includes a SSID (Service Set Identifier), password, encryption key, MAC address and the like. Moreover, the connection-information-managing unit 113, when there is a connection request from the portable terminal 300B, stores request-having information such as a flag that indicates that there is a connection request from an apparatus that is not compatible with P2P communication.

Moreover, the connection-information-managing unit 113, according to an instruction from the system-control unit 119, changes the current connection information. The connection-information-managing unit 113, when changing the connection information, changes, for example, the SSID and password of the SSID, password, encryption key, and MAC address. The connection-information-managing unit 113 may also change one of the SSID and password. In doing so, it is possible to disable automatic connection that is executed after communication disconnection is selected on the portable terminal 300B side, and make it so that an unintended connection request from the portable terminal 300B side is not received. Moreover, the connection-information-managing unit 113, when connection information is changed according to an instruction from the system-control unit 119, deletes the request-having information that is already stored.

The RAM 114 is a work memory for executing programs. The ROM 115 stores a control program for performing operation checks and the like of each unit. The image-processing unit 116 performs, for example, image processing (rasterization) on a printing job that is registered in a user box of the HDD 105. The system-control unit 119 causes the printing data that has undergone image processing by the image-processing unit 116 to be temporarily stored in the RAM 114.

The panel-operation-control unit 117 controls the display operation of the panel unit 104. Moreover, the panel-operation-control unit 117, via the panel unit 104, receives settings and the like for starting printing, copying, a FAX, data transmission/reception via a network and the like. Moreover, the panel-operation-control unit 117, via the panel unit 104, receives a selection via a confirmation screen 104A (described later) for whether or not to activate the P2P communication function as a GO. Furthermore, the panel-operation-control unit 117, via the panel unit 104, causes connection information of wireless communication to be displayed on a confirmation screen 104B (described later). The HDD-control unit 118 controls reading data from or writing data to the HDD 105 and the like.

The system-control unit 119 controls linked operation of each unit. Moreover, the system-control unit 119, based on a connection request received by the communication-control unit 112, determines whether or not communication is P2P communication compatible. When a communication request is from the portable terminal 300B that is not compatible with P2P communication, the system-control unit 119 causes the connection-information-management unit 113 to store the request-having information that indicates that there is a connection request from an apparatus that is not P2P communication compatible. Moreover, the system-control unit 119, when there is a connection request from the portable terminal 300B that is not compatible with P2P communication, causes the connection-information-managing unit 113 to change the connection information for wireless communication. Furthermore, the system-control unit 119 instructs the connection-information-managing unit 113 to delete the request-having information that is already stored.

On the other hand, the portable terminal 300A includes an antenna 301, and a control unit 310 for controlling a panel unit 302. The antenna 301 transmits and receives radio signals to and from the relay apparatus 200 and to and from the transmitting/receiving unit 103 of the MFP 100. The panel unit 302 is a device such as a touch panel for performing selections and the like of the various functions of the portable terminal 300A.

The control unit 310 is a processor for controlling the overall operation of the portable terminal 300A by executing a control program and the like. The control unit 310 includes a communication-control unit 311, a RAM 312, a ROM 313, a connection-information-managing unit 314, a panel-operation-control unit 315, and a system-control unit 316. Moreover, these units are connected to a data bus 317.

The communication-control unit 311, via the antenna 301, performs control of transmission and reception of data to and from the relay apparatus 200 or MFP 100. The RAM 312 is a work memory for executing programs. The ROM 313 stores a control program for performing operation checks of each unit. The connection-information-managing unit 314 manages wireless communication dedicated software for executing wireless communication, P2P communication dedicated software for executing P2P communication, and connection information. Moreover, the connection-information-managing unit 314, according to an instruction from the system-control unit 316, activates the wireless communication dedicated software and the P2P communication dedicated software. The connection information includes a SSID (Service Set Identifier), a password, an encryption key, a MAC address and the like. Furthermore, the connection-information-managing unit 314 in the case of the portable terminal 300B does not manage P2P communication dedicated software for executing P2P communication, however, manages wireless communication dedicated software for executing wireless communication and connection information. The panel-operation-control unit 315 controls the display operation of the panel unit 302.

The system-control unit 316 controls linked operation of each unit. Moreover, the system-control unit 316, after the panel-operation-control unit 315 receives a connection request via the panel unit 302 to connect to the MFP 100, transmits a connection request to the MFP 100 via the communication-control unit 311.

Next, an example of the contents displayed on the panel unit 104 of the MFP 100 will be explained with reference to FIG. 3A and FIG. 3B.

Figure 3A:
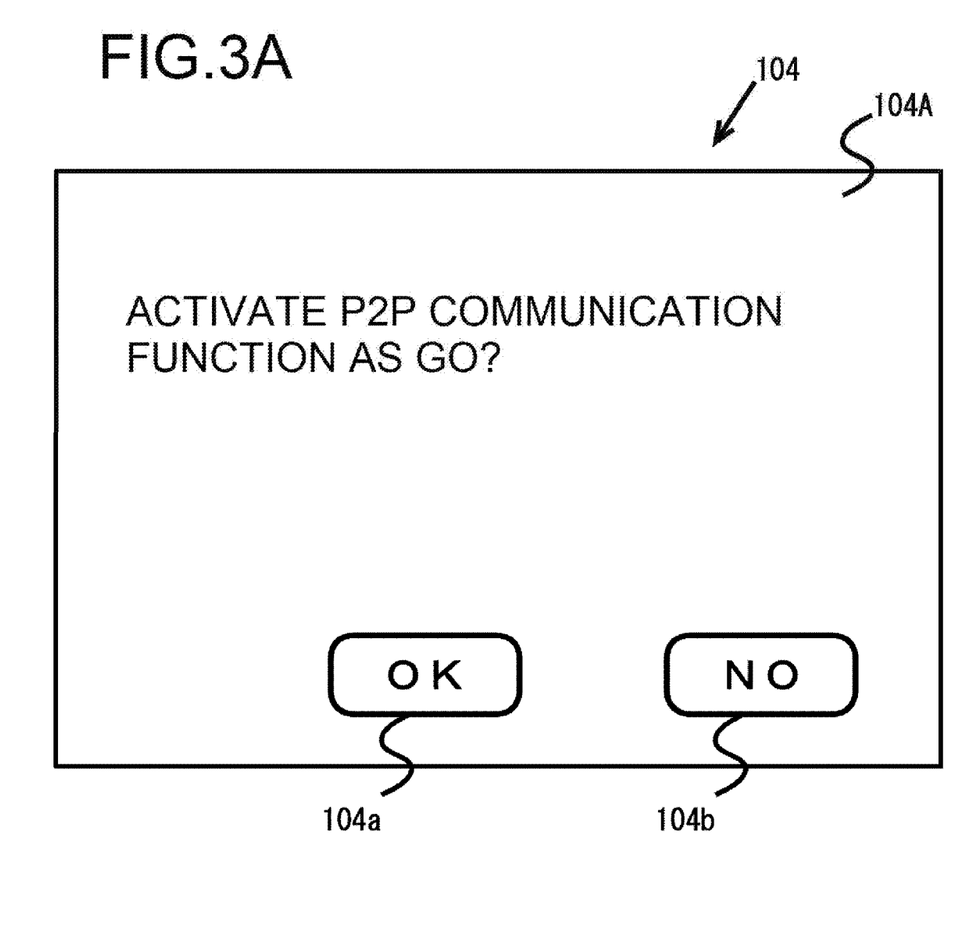
FIG. 3A illustrates an example of contents that are displayed on the panel unit of the MFP in FIG. 1, and illustrates a confirmation screen for prompting whether or not to have the MFP activate a P2P communication function as a GO.

First, FIG. 3A illustrates a confirmation screen 104A that prompts whether or not to have the MFP 100 activate the P2P communication function as a GO. This confirmation screen 104A is displayed by a user operation when allowing a connection request to be received from the portable terminal 300B for only a specified time. In other words, the confirmation screen 104A is displayed on the panel unit 104 when, for example, a GO activation button is operated. On the confirmation screen 104, the contents "Activate the P2P communication function as a GO?", an OK button 104a that is touch operated when prompting activation, and a NO button 104b that is touch operated when not prompting activation are displayed.

Figure 3B:
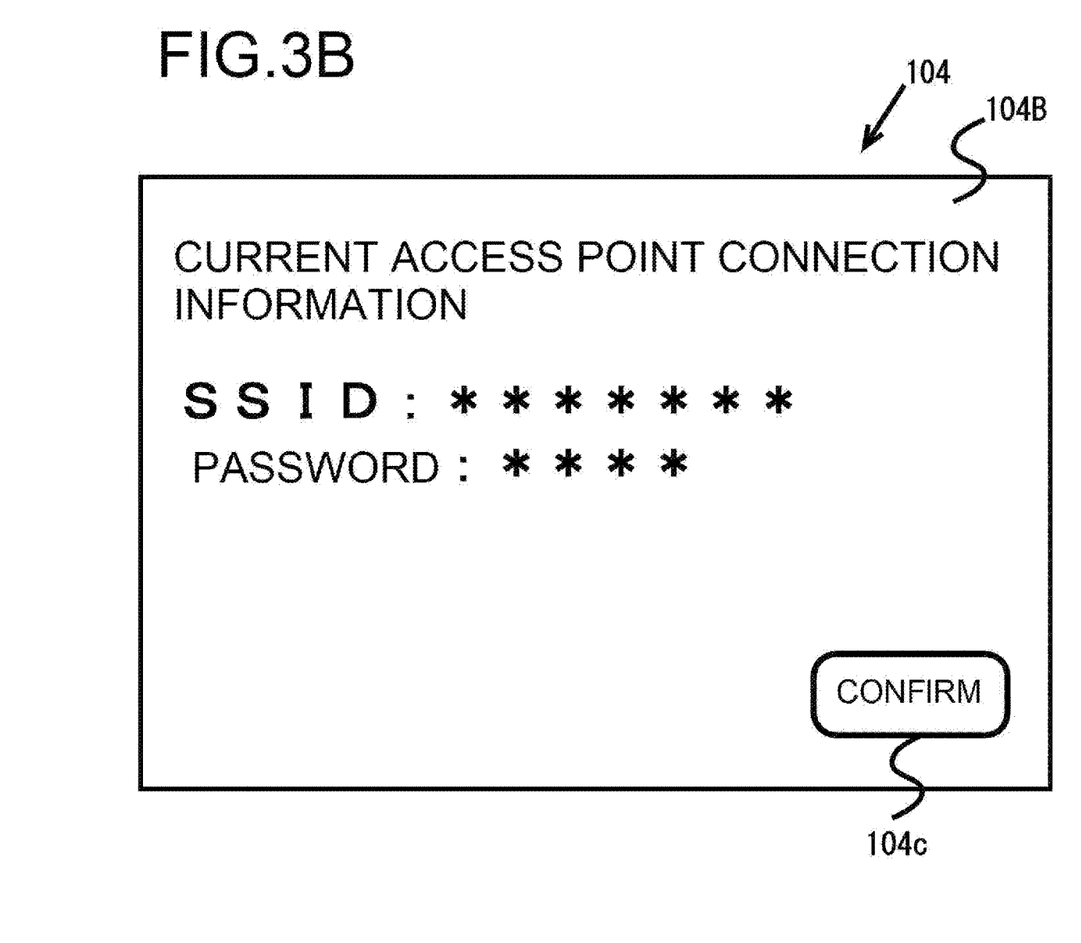
FIG. 3B illustrates an example of contents that are displayed on the panel unit of the MFP in FIG. 1, and illustrates a confirmation screen that displays connection information for the current access point of the MFP.

FIG. 3B illustrates a confirmation screen 104B that is displayed on the panel unit 104 when the OK button 104a in FIG. 3A is touch operated. Contents that indicate the SSID and password that are connection information of the current access point of the MFP 100, and a confirmation button 104c that is touch operated when confirming a connection request are displayed on the confirmation screen 104B.

In other words, as described above, when there is a connection request from the portable terminal 300B that is not compatible with P2P communication, the system-control unit 119 causes the connection-information-managing unit 113 to change the connection information of wireless communication. In this case, on the portable terminal 300B side, automatic connection that is executed after cutting communication with the MFP 100 is selected becomes impossible due to the change in the connection information. Making automatic connection on the portable terminal 300B side impossible is effective against unintended connection requests from the portable terminal 300B. However, even though the user tries to send a connection request from the portable terminal 300B, the connection information on the MFP 100 side is changed, so it is not possible to send a connection request from the portable terminal 300B.

Therefore, when the GO activation button is operated for example in response to a user request, the system-control unit 119 causes the confirmation screen 104A in FIG. 3A to be displayed on the panel unit 104. Here, when the NO button 104b is touch operated, the system-control unit 119 causes the confirmation screen 104A to switch to an initialization screen, and when the OK button 104a is touch operated, the system-control unit 119 causes the confirmation screen 104B in FIG. 3B to be displayed.

The SSID and password that are the wireless communication connection information that is changed by the connection-information-managing 113 are displayed on the confirmation screen 104B, so the user can confirm the changed connection information. Moreover, on the portable terminal 300B side, by detecting a radio signal that is transmitted from the transmitting/receiving unit 103 of the MFP 100, the connection information that is changed on the MFP 100 side is displayed in a list of access points that is displayed on the panel unit 302. Here, the connection information that is displayed on the conformation screen 104B is confirmed, and by selecting the connection information that is changed on the MFP 100 side and that is displayed in the access point list, it is possible to send a connection request to the MFP 100 from the portable terminal 300B. The connection-information-managing unit 113 changes the current connection information. When changing the connection information, the connection-information-managing unit 113 changes, for example, the SSID and password of the SSID, password, encryption key and MAC address. The connection-information-managing unit 113 may also change only the SSID without changing the password. Moreover, as will be described in detail later, when the OK button 104a is touch operated on the confirmation screen 104A, the system-control unit 119 activates the P2P communication function as a GO.

Figure 4:
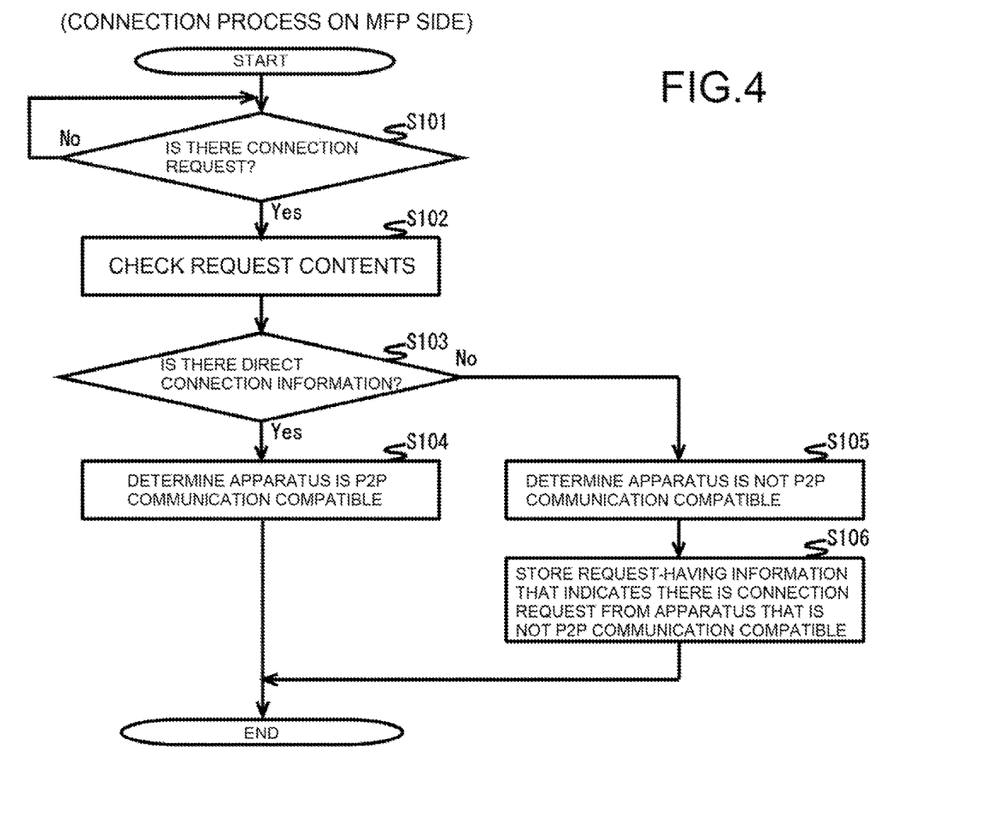
FIG. 4 illustrates steps of a connection process on the MFP side in FIG. 1 for connecting to a portable terminal.

Next, the connection process on the MFP 100 side will be explained with reference to FIG. 4. In the following, the case will be explained in which the connection-information-managing unit 113 does not store the request-having information as described above that indicates that there is a connection request from an apparatus that is not compatible with P2P communication.

(Step S101)

The system-control unit 119 determines whether or not there is a connection request.

In this case, the system-control unit 119 determines that there is no connection request when there is no notification from the communication-control unit 112 indicating that a connection request is received from the portable terminal 300A or 300B (step S101: NO).

However, the system control unit 119 determines that there is a connection request when there is a notification from the communication-control unit 112 indicating that a connection request is received from the portable terminal 300A or 300B (step S101: YES), and processing moves to step S102.

(Step S102)

The system-control unit 119 checks the request contents.

(Step S103)

The system-control unit 119 determines whether or not there is direct connection information in the request contents.

Direct connection information is information such as P2P IE (Peer-to-Peer Information Element) or the like.

When the system-control unit 119 determines that there is direct connection information in the request contents (step S103: YES), processing moves to step S104.

However, when the system-control unit 119 determines there is no direct connection information in the request contents (step S103: NO), processing moves to step S105.
(Step S104)

The system-control unit 119 determines there is an apparatus that is compatible with P2P communication.

In this case, the system-control unit 119 determines that the apparatus that is compatible with P2P communication is portable terminal 300A.

The system-control unit 119 replies to the connection request, establishes a connection with the portable terminal 300A using P2P communication, and ends processing.
(Step S105)

The system-control unit 119 determines there is an apparatus that is not compatible with P2P communication.

In this case, the system control unit 119 determines that the apparatus that is not compatible with P2P communication is portable terminal 300B, and processing moves to step S106.
(Step S106)

The system-control unit 119 causes the connection-information-managing unit 113 to store information that has a request that indicates that there is a connection request from an apparatus that is not compatible with P2P communication.

In this case, the system-control unit 119 replies to the connection request, establishes a connection with the portable terminal 300B using wireless communication, and ends processing.

The portable terminal 300B, following the connection request, transmits connection information that is managed by the connection-information-managing unit 314 to the MFP 100. In step S106, when the connection information that is transmitted from the portable terminal 300B and the connection information that is managed by the connection-information-managing unit 113 are compared and both match, the system-control unit 119 of the MFP 100 establishes a connection with the portable terminal 300B using wireless communication. Here, the connection information that is selected from the list of access points that is displayed on the panel unit 302 may be transmitted to the MFP 100. For example, the portable terminal 300B may transmit the connection information that is selected using the panel unit 302 by the user from among connection information that is registered in the portable terminal 300B. Moreover, the portable terminal 300B may detect a radio signal (for example, a beacon) that is transmitted from the transmitting/receiving unit 103 of the MFP 100. Thus, the portable terminal 300B may acquire connection information that is included in the detected radio signal. The portable terminal 300B may make the connection information that is included in the radio signal (for example, a beacon) that is transmitted by the MFP 100 select by the user using the panel unit 302, and it transmits.

Next, an example of the process for changing connection information for wireless communication will be explained with reference to FIG. 5.
(Step S201)

The system-control unit 119 determines whether or not there is a connected apparatus.

In this case, when there is no notification from the communication-control unit 112 that indicates there is no connection by wireless communication and/or P2P communication, the system-control unit 119 determines that there is a connected apparatus (step S201: YES).

However, when there is a notification from the communication-control unit 112 that indicates there is no connection by wireless communication and/or P2P communication, the system-control unit 119 determines that there is no connected apparatus (step S201: NO), and processing moves to step S202.

When cutting communication is selected on the portable terminal 300B side after there is a connection request from the portable terminal 300B that is not compatible with P2P communication, there is a possibility that there will be automatic connection again as described above even though communication with the MFP 100 is temporarily ended. In this case, the system-control unit 119 determines there is no connected apparatus even though there is a connection request from the portable terminal 300B.
(Step S202)

The system-control unit 119 causes a blocking process to be executed.

In this case, the system-control unit 119 causes the communication-control unit 112 to execute the blocking process so that a connection request is not received from a portable terminal 300A, 300B.
(Step S203)

The system-control unit 119 determines whether or not the blocking process has ended.

In this case, when there is no notification from the communication-control unit 112 indicating the end of the blocking process, the system-control unit 119 determines that the blocking process has not ended (step S203: NO).

However, when there is a notification from the communication-control unit 112 indicating the end of the blocking process, the system-control unit 119 determines that the blocking process has ended (step S203: YES), and processing moves to step S204.
(Step S204)

The system-control unit 119 determines whether or not there is the request-having information.

In this case, the system-control unit 119 checks whether or not the connection-information-managing unit 113 is storing the request-having information such as a flag that indicates that there is a connection request from the portable terminal 300B that is not compatible with P2P communication. When the connection-information-managing unit 113 is not storing the request-having information, the system-control unit 119 determines there is no the request-having information (step S204: NO), and processing moves to step S206.

However, the system-control unit 119 checks whether or not the connection-information-managing unit 113 is storing the request-having information such as a flag that indicates that there is a connection request from the portable terminal 300B that is not compatible with P2P communication. When the connection-information-managing unit 113 is storing the request-having information, the system-control unit 119 determines there is request-having information (step S204: YES), and processing moves to step S205.
(Step S205)

The system-control unit 119 causes the connection information to be changed.

In this case, the system-control unit 119 causes the connection-information-managing unit 113 to change the SSID and password that are connection information for wireless communication. As a result, it is possible to disable automatic connection that is executed on the portable terminal 300B side after cutting communication is selected, and when the MFP 100 is activated as a GO, it is possible to not receive unintended connection requests from the portable terminal 300B side. The system-control unit 119 may cause the connection-information-managing unit 113 to change one of the SSID or the password that are the connection information for wireless communication.

Moreover, the system-control unit 119 may cause the connection-information-managing unit 113 to delete the request-having information that is already being managed. As a result, when there is a connection request from the portable terminal 300B after the connection information for wireless communication is changed, the system-control unit 119 can cause the connection-information managing unit 113 to newly store the request-having information that indicates that there is a connection request from the portable terminal 300B.

The system-control unit 119, by confirming that the connection-information-managing unit 113 is storing the request-having information is also able to determine for certain that there is a connection request from the portable terminal 300B after the connection information for wireless communication is changed.

(Step S206)

The system-control unit 119 causes the blocking process to be stopped.

In this case, the system-control unit 119 causes the communication-control unit 112 to stop the blocking process so that connection requests are not received from the personal terminals 300A, 300B.

Figure 6:
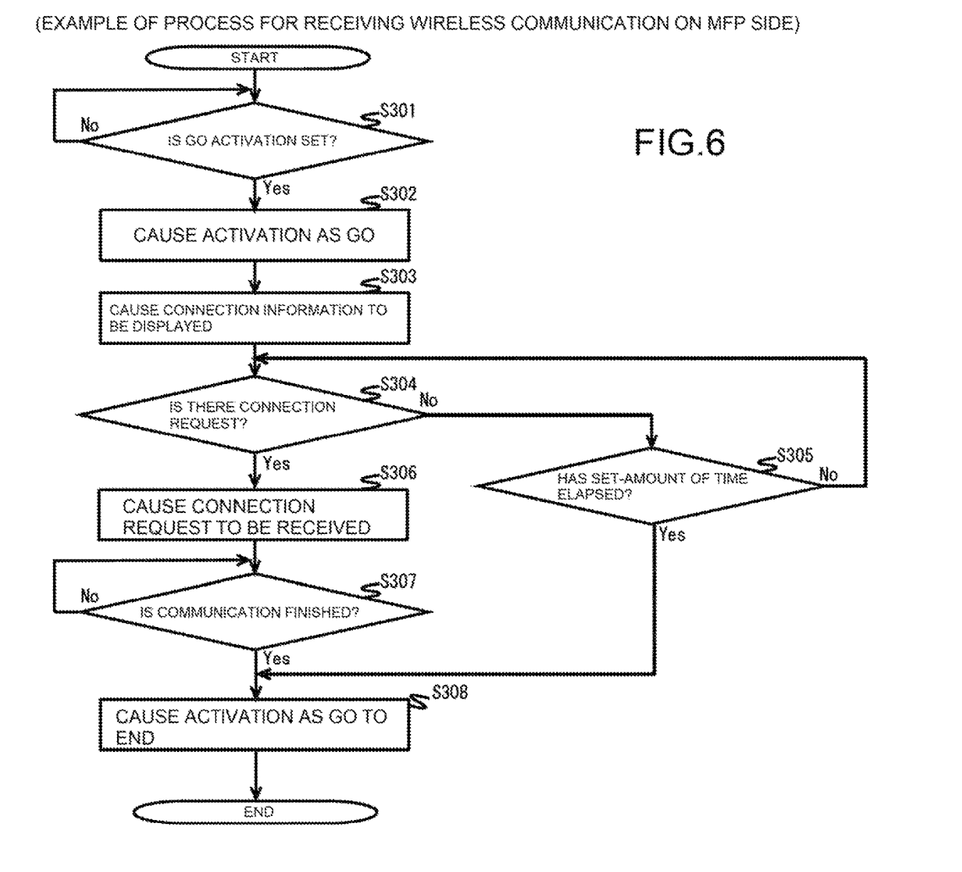
FIG. 6 illustrates steps of a receiving process on the MFP side in FIG. 1 for receiving wireless communication.

Next, the process for receiving wireless communication on the MFP 100 side will be explained with reference to FIG. 6. In the following, the case in which there is a connection request from portable terminal 300B that is not compatible with P2P communication will be explained.

(Step S301)

The system-control unit 119 determines whether or not activation of a GO is set.

In this case, when there is no notification from the panel-operation-control unit 117 indicating that the OK button 104a on the confirmation screen 104A illustrated in FIG. 3A is touch operated, the system-control unit 119 determines that activation of a GO is not set (step S301: NO).

However, when there is a notification from the panel-operation-control unit 117 indicating that the OK button 104a on the confirmation screen 104A illustrated in FIG. 3A is touch operated, the system-control unit 119 determines that activation of a GO is set (step S301: YES), and processing moves to step S302.

(Step S302)

The system-control unit 119 causes activation as a GO.

In this case, the system-control unit 119 causes the connection-information-managing unit 113 to activate the wireless communication dedicated software, and the P2P communication dedicated software, and to execute a connection process.

(Step S303)

The system-control unit 119 causes connection information to be displayed.

In this case, the system-control unit 119 instructs the panel-operation-control unit 117 to display connection information. At this time, the panel-operation-control unit 117 causes the panel unit 104 to display the confirmation screen 104B illustrated in FIG. 3B.

Figure 5:
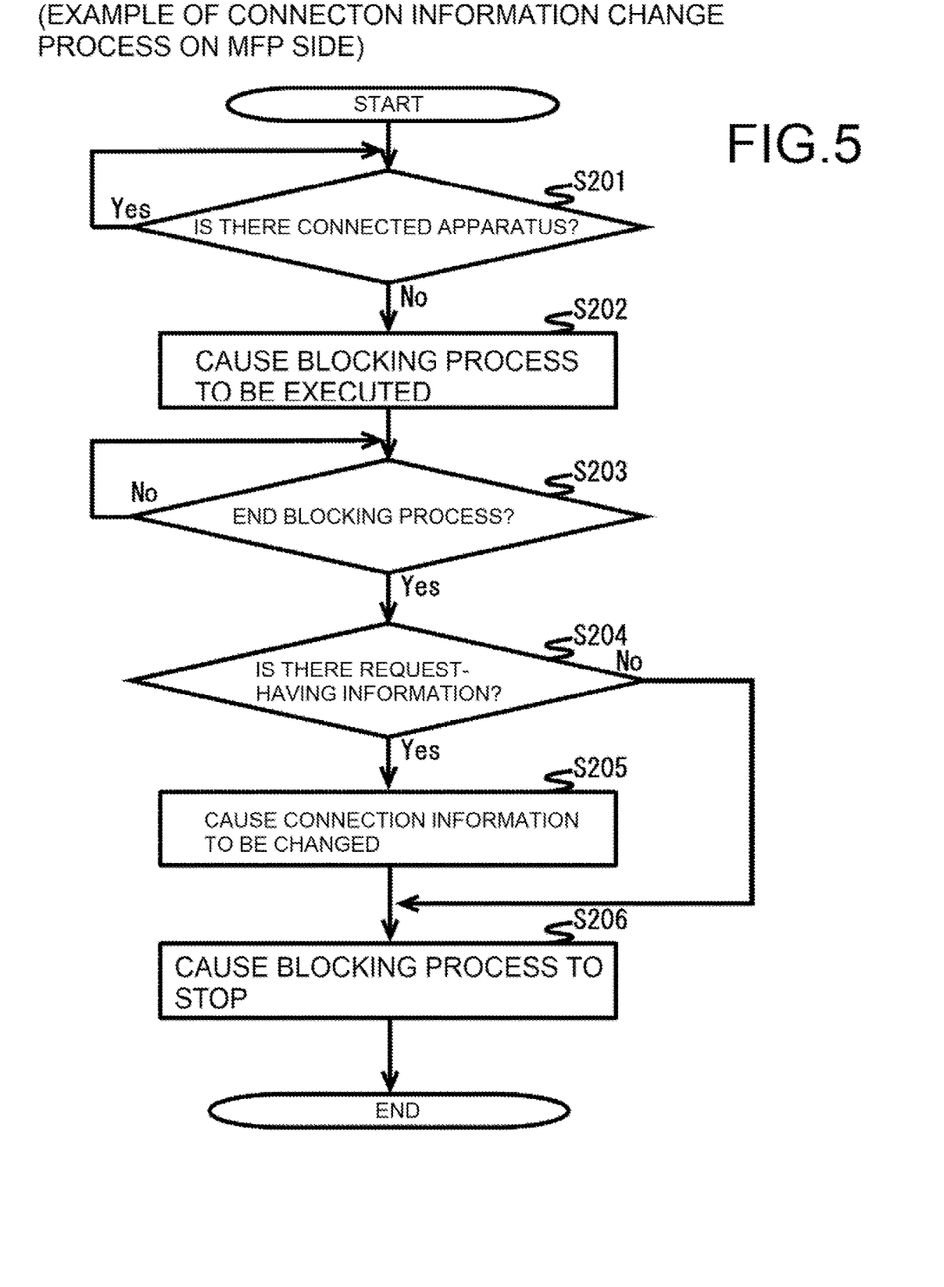
FIG. 5 illustrates steps of a change process on the MFP side in FIG. 1 for changing connection information.

Here, the connection information that is displayed on the confirmation screen 104B is the content that is changed in step S205 in FIG. 5. On the portable terminal 300B side, by detecting a radio signal (for example, a beacon) that is transmitted from the transmitting/receiving unit 103 of the MFP 100, connection information that is changed on the MFP 100 side is displayed in an access point list that is displayed in the panel unit 302. The user checks the connection information that is displayed on the confirmation screen 104B, and by selecting the connection information that is changed on the MFP 100 side that is displayed in the access point list, can send a connection request to the MFP 100 from the portable terminal 300B.

(Step S304)

The system-control unit 119 determines whether or not there is a connection request.

In this case, when there is no notification from the communication-control unit 112 indicating that a connection request is received from the portable terminal 300B, the system-control unit 119 determines that there is no connection request (step S304: NO), and processing moves to step S305.

However, when there is a notification from the communication-control unit 112 indicating that a connection request is received from the portable terminal 300B, the system-control unit 119 determines that there is a connection request (step S304: YES), and processing moves to step S306.

(Step S305)

The system-control unit 119 determines whether or not a set amount of time has elapsed.

In other words, the system-control unit 119 causes a timer to be activated after the OK button 104a on the conformation screen 104A is touch operated in step S301. When the elapsed time has not reached a preset time (for example 30 seconds), the system-control unit 119 determines that the set amount of time has not elapsed (step S305: NO), and processing returns to step S304.

However, when the elapsed time has reached a preset time (for example 30 seconds), the system-control unit 119 determines that the set amount of time has elapsed (step S305: YES), and processing moves to step S308.

Here, the set amount of time that is the preset time is taken to be 30 seconds, for example, however, the set time is not limited to 30 seconds, and the setting can be arbitrarily changed.

Moreover, the system-control unit 119 determines that the set amount of time has elapsed, and processing moves to step S308. As a result, when there is no connection request from the portable terminal 300B over a long period of time regardless that the system-control unit 119 instructs the panel-operation-control unit 117 in step S303 to display connection information, for example, it is possible to end receiving of a connecting request. As a case in which there is no connection request from the portable terminal 300B for a long period of time could be assumed to be a case in which, for example, a user is called away in an emergency and is separated from the MFP 100.

(Step S306)

The system-control unit 119 causes a connection request to be received.

In this case, by causing the communication-control unit 112 to receive a connection request (connection information that is changed on the MFP 100 side) from the portable terminal 300B, the system-control unit 119 causes the communication-control unit 112 to establish a connection with the portable terminal 300B using wireless communication.

(Step S307)

The system-control unit 119 determines whether or not communication has ended.

In this case, when there is no notification from the communication-control unit 112 indicating that cutting communication is selected on the portable terminal 300B side, the system-control unit 119 determines that communication has not ended (step S307: NO).

However, when there is a notification from the communication-control unit 112 indicating that cutting communication is selected on the portable terminal 300B side, the system-control unit 119 determines that communication has ended (step S307: YES), and processing moves to step S308.

The system-control unit 119 may also determine that communication has ended when a session with the portable terminal 300B is not at a set amount of time (for example, 60 seconds). Moreover, the system-control unit 119 may also determine that communication has ended after an operation button for cutting communication is operated on the MFP 100 side.

(Step S308)

The system-control unit 119 causes activation as a GO to end.

In this case, the system-control unit 119 causes the connection-information-managing unit 113 to end execution of the connection process that is based on the wireless communication dedicated software and P2P communication dedicated software.

At this time, the system-control unit 119 may execute a change process for changing the connection information for wireless communication illustrated in FIG. 5.

In this way, in this embodiment, the communication-control unit 112 controls wireless communication and P2P type communication (P2P communication) via an access point. Moreover, the connection-information-managing unit 113 manages connection information of an access point, and the request-having information that indicates that there is a connection request from the portable terminal 300B (client) using wireless communication. Furthermore, the system-control unit 119 causes the connection-information-managing unit 113 to change the connection information when the connection-information-managing unit 113 is managing the request-having information.

In this way, when there is a connection request from the portable terminal 300B (client) using wireless communication, the system-control unit 119 causes the connection information of the access point to be changed. As a result, it is possible to disable automatic connection that is executed after cutting communication is selected on the portable terminal 300B side (client side), and unintended connection requests from the portable terminal 300B side (client side) are not received. As a result, it is possible to prevent a shortage of wireless LAN resources.

Moreover, in this embodiment, by changing the connection information of an access point each time there is a connection request from the portable terminal 300B using wireless communication, it is possible to disable automatic connection that is executed after cutting communication is selected on the portable terminal 300B side.

In this embodiment, an example is given of a MFP 100 as a communication apparatus, however, the embodiment is not limited to this example, and of course the portable terminal 300A and other apparatuses that are compatible with P2P communication such as a camera, television, game machine and the like can be applied.

In a typical communication apparatus described above, wireless communication is established when a specified communication partner is an apparatus that satisfies specified conditions, so a communication apparatus that is not intended by the user will not be specified as a communication partner.

Incidentally, an apparatus that is compatible with P2P communication is equipped with a function that corresponds to an access point (AP), so when one apparatus is compatible with P2P communication, another apparatus (apparatus that is compatible with the normal Wi-Fi (registered trademark) standard) may perform communication even though not being compatible with P2P communication.

Moreover, in the case of a pair of apparatuses that are compatible with P2P communication, it is possible for one of the apparatuses to become an apparatus (GO: Group Owner) that corresponds to an access point (AP). As a result, plural apparatuses (clients) within a group that use the group owner (GO) may communicate with other apparatuses via the group owner (GO) in the same way as an wireless LAN access point (AP) using Wi-Fi (registered trademark) (Infrastructure mode).

Furthermore, in the case of a pair of apparatuses that are compatible with P2P communication, when cutting communication is selected on the client side, for example, communication with the group owner (GO) ends. However, in the case of a client that is not compatible with P2P communication, when cutting communication is selected, communication with the group owner (GO) ends temporarily, however there is a possibility that communication will be automatically connected again. In other words, in the case of a client that is not compatible with P2P communication, communication is performed with the group owner (GO) based on the access point (AP). Therefore, when wireless communication using Wi-Fi (registered trademark) is effective even when cutting communication is selected on the client side, communication will be automatically connected based on the access point (AP) history as long as the access point (AP) history is not deleted.

As a result, on the group owner (GO) side, an unintended connection request from the client side will be received, and a problem of a shortage of wireless LAN resources will occur.

Incidentally, when selecting to cut communication on the client side, it is possible to prevent unintended automatic connection from the client side by disabling the Wi-Fi (registered trademark) communication function, or deleting the access point history. However, it is then necessary to enable the Wi-Fi (registered trademark) communication function, or perform an operation to select and set an access point (AP) each time the Wi-Fi (registered trademark) communication function is used. In this case, taking into consideration convenience for the user, blocking unintended connection requests from the client side on the group owner (GO) side is considered to be effective.

With the communication apparatus and communication program according to the present disclosure, unintended connection requests from the client side are not received, so it is possible to prevent a shortage of wireless LAN resources.

What is claimed is:

1. A communication apparatus, comprising:
   a communication-control unit that controls wireless communication via an access point and P2P type communication;
   a connection-information-managing unit that, when the communication apparatus operates as a group owner that corresponds to the access point, manages a first connection information of the access point, and request-having information that indicates there is a connection request from a client using the wireless communication; and a system-control unit that, when there is a connection request from a client by the wireless communication, causes the connection-information-management unit to manage the request-having information, compares a second connection information transmitted from the client with the first connection information, and establishes a connection with the client by the wireless communication when both match; wherein the system-control unit (1) causes the communication-control unit to block the communication when the connection by the wireless communication and/or the P2P type communication is lost, (2) in the case of (1), causes the connection-information-managing unit to change the first connecting information when the connection-information-managing unit is managing the request-having information, and (3) when the first connecting information is changed, causes deletion of the request-having information and causes the communication-control unit to stop the block of the communication.

2. The communication apparatus according to claim 1, comprising a panel unit; wherein the system-control unit causes the communication-control unit to receive a connection request from the client using the wireless communication within a set amount of time when activation by the group owner via the panel unit is instructed, and when communication using the wireless communication ends, or when there is no connection request from the client using the wireless communication within the set amount of time, causes activation by the group owner to end.

3. A non-transitory computer-readable recording medium for storing a communication program that can be executed by a computer of a communication apparatus; and the communication program causes the computer to operate as:

a communication-control unit that controls wireless communication via an access point and P2P type communication;

a connection-information-managing unit that, when the communication apparatus operates as a group owner that corresponds to the access point, manages a first connection information of the access point, and request-having information that indicates there is a connection request from a client using the wireless communication; and a system-control unit that, when there is a connection request from a client by the wireless communication, causes the connection-information-management unit to manage the request-having information, compares a second connection information transmitted from the client with the first connection information, and establishes a connection with the client by the wireless communication when both match; wherein the system-control unit (1) causes the communication-control unit to block the communication when the connection by the wireless communication and/or the P2P type communication is lost, (2) in the case of (1), causes the connection-information-managing unit to change the first connecting information when the connection-information-managing unit is managing the request-having information, and (3) when the first connecting information is changed, causes deletion of the request-having information and causes the communication-control unit to stop the block of the communication.

* * * * *